March 13, 1934.　　　S. J. THOMAS　　　1,950,760
CONDENSER
Filed Jan. 2, 1929　　　3 Sheets-Sheet 1
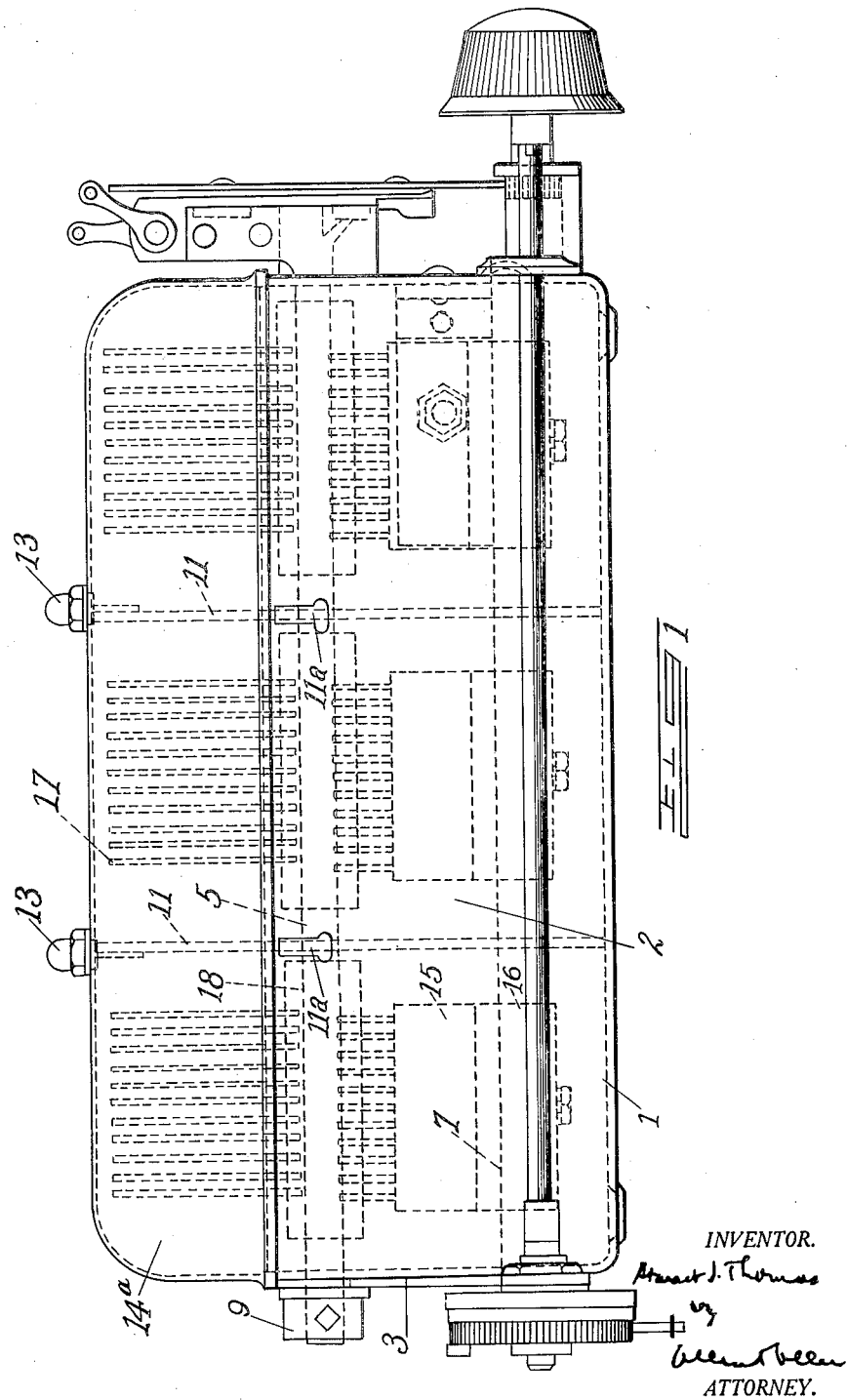
INVENTOR.
Stewart J. Thomas
ATTORNEY.

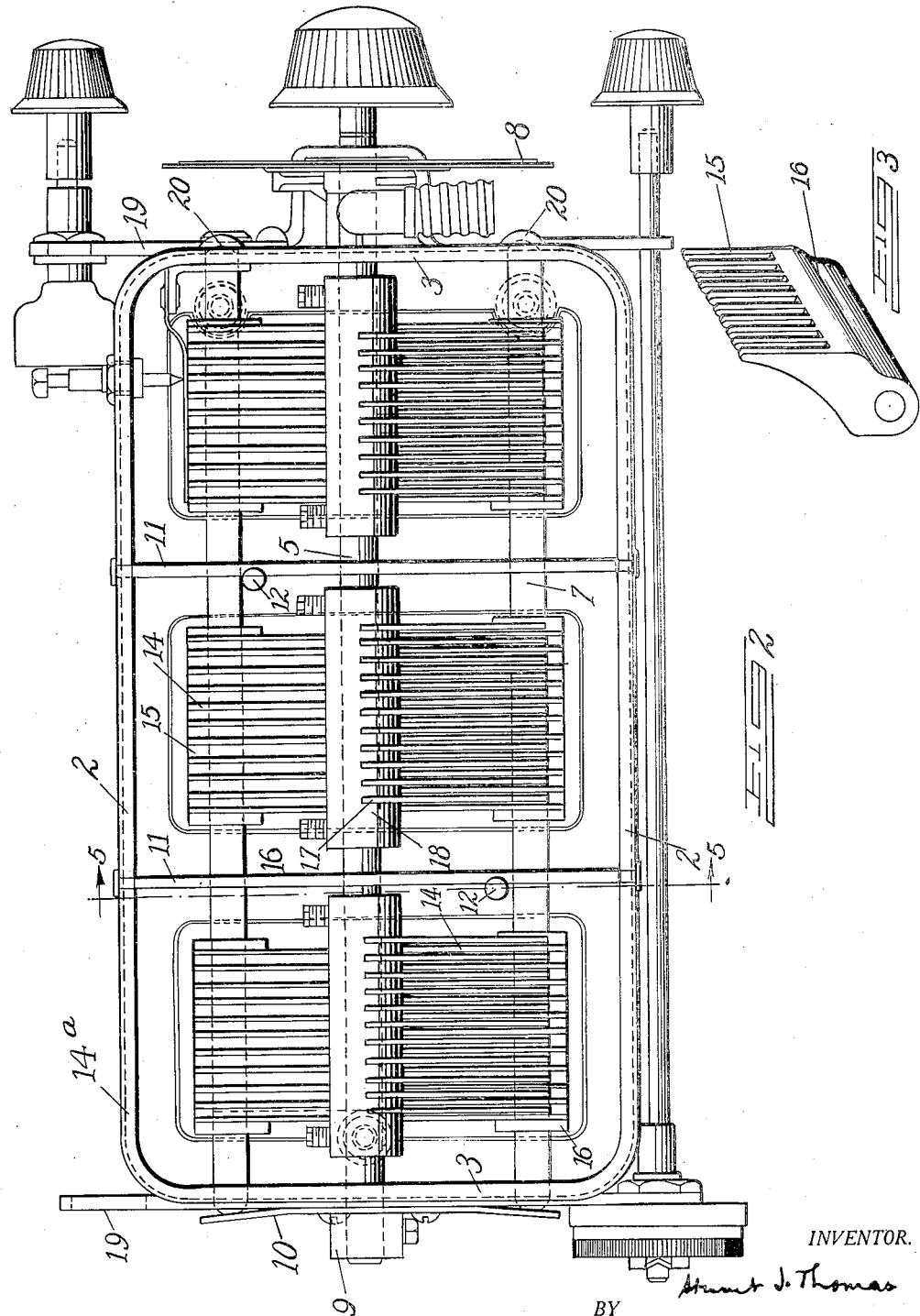

March 13, 1934.   S. J. THOMAS   1,950,760
CONDENSER
Filed Jan. 2, 1929   3 Sheets-Sheet 3
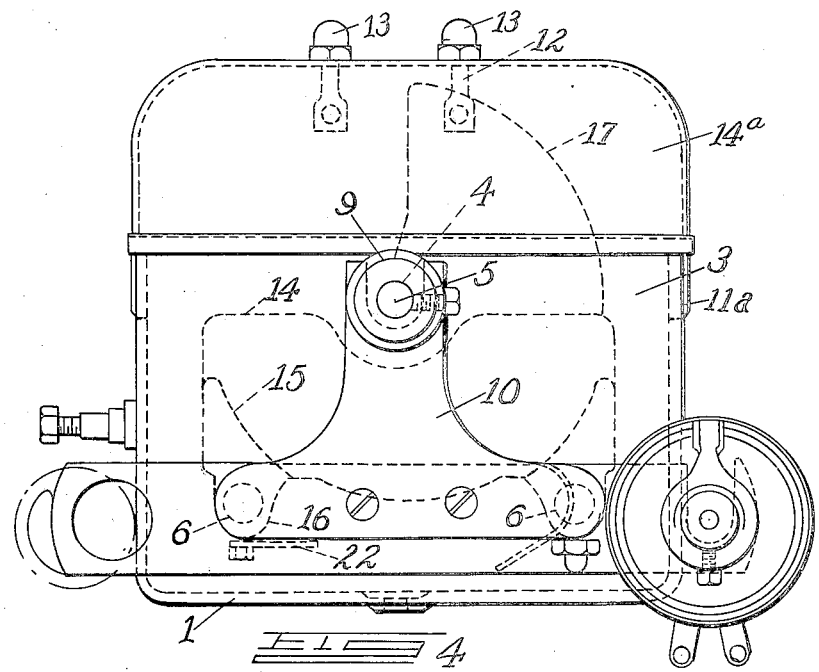
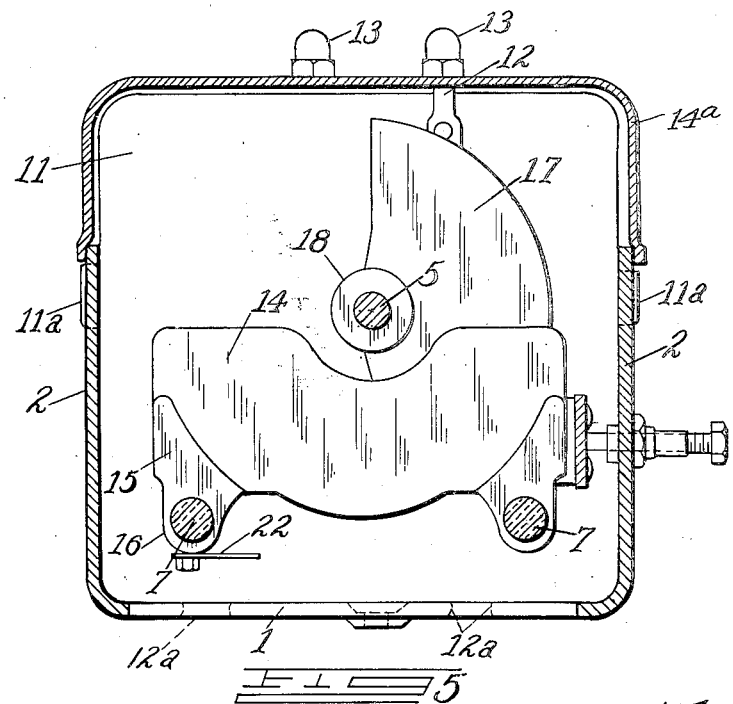
INVENTOR.
Stuart J. Thomas
BY
ATTORNEY.

Patented Mar. 13, 1934

1,950,760

UNITED STATES PATENT OFFICE 1,950,760

CONDENSER

Stuart J. Thomas, Cincinnati, Ohio, assignor to The Crosley Radio Corporation, Cincinnati, Ohio, a corporation of Ohio Application January 2, 1929, Serial No. 329,709

2 Claims. (Cl. 175—41.5)

My invention relates to the structure of gang condensers and has as its object the production of a gang condenser which has a small number of parts and can be quickly and accurately assembled.

It is also my object to provide a gang condenser which is completely shielded as to each element thereof.

Specifically I provide a metal box for the condenser gang, the ends of which are accurately punched with holes for stator and rotor supporting rods or shafts, said box having partitions therein and a lid. I support the stator parts on two spaced rods which, because of accurate punching of holes in the box ends, will definitely locate the stator parts with relation to the rotor parts, in both the vertical and the horizontal direction.

I accomplish my objects by that certain construction and arrangement of parts to be hereinafter more specifically pointed out and claimed.

In the drawings:—

Figure 1 is a side elevation of the device complete in its preferred form.

Figure 2 is a plan view of the same with the lid removed.

Figure 3 is a perspective of one of the stator frames.

Figure 4 is an end view of the structure of Figure 1.

Figure 5 is a section on the line 5—5 of Figure 2.

The box is formed preferably by deep drawing a piece of metal to provide a one-piece structure with a slotted base 1, sides 2, and ends 3.

Each end is perforated with a hole 4 for the rotor shaft 5, and holes 6—6 below and on both sides of the hole 4 for the two rods of insulation 7—7 which mount the stator plates.

The operating means illustrated at 8 in the form of a toothed disk, is fixed to the rotor shaft 5 at one end thereof, outside of the box, and the rotor shaft is equipped with a collar 9 at the other end. A three-armed plate 10, screwed to the end wall of the box opposite the operating end, bears against the ends of both stator supporting rods and also lies behind the collar on the rotor shaft.

The box has partitions 11—11, which have ears 11a that enter slots in the top edge of the box, and ears 12a that extend through holes in the bottom of the box. The partitions have holes therein to receive the rotor shaft and stator rods. Upon assembling the box the partitions are dropped in place and the ears wedged to permanently hold the parts together. The partitions extend to the height of the lid of the box and may have mounting screws 12 welded to their upper ends to take the nuts 13 for holding down the lid.

The lid of the box, as shown at 14a, is domed up to follow the edges of the partitions, and is flanged to rest on the top edges of the box.

In the particular structure shown, there are thus provided three chambers, each enclosed metallicly from each other and also closed from the outside.

The stator plates 14 for the several chambers, are provided each with a pair of frames (Fig. 3), comprising a slotted portion 15 in which the stator plates are set and soldered in place, and a sleeve portion 16.

The rotor plates 17 are assembled and soldered to the sleeve portions 18, said sleeves, in my preferred embodiment, having set screws therein.

In assembling the device the stator parts are set in the several chambers and the rods 7 of dielectric material thrust through the holes in the end walls of the box and inserted through the sleeve portion 16 of the stator frames. The rods thus positively locate the stators vertically of the box and horizontally of the box. The rotors are then mounted by inserting the rotor shaft through the rotor sleeves of each rotor section, one section to each chamber or compartment.

The rotor sleeves are then adjusted along the shaft to obtain proper spacing and clamped tightly in said adjusted position by the set screws.

The particular structure shown has mounting brackets 19 for other mechanisms, the one at the operating end having cavities 20 therein to receive the ends of the stator supporting rods. The one at the opposite end has holes therein to permit insertion of the stator rods.

It will be apparent that my structure is one which requires a minimum of work and care in assembly, since the box itself provides for all locating of stator and rotor parts except spacing of the same axially with relation to each other.

The terminals 22, located on the stator frames, are available through the slotted base of the box for electrical connections, and the rotors are grounded to the common shaft and thence to the box itself which may be equipped with any desired terminal, such as is shown at 23.

Having thus described my invention, what I claim as new and desire to secure by Letters Patent, is:—

1. In a gang condenser construction comprising a plurality of sets of rotor plates spaced along a common axis of rotation, and a plurality of sets of stator plates arranged in opperative relation to the respective sets of rotor plates, a box made up of rigidly connected side and end walls and a bottom rigidly connected to the side and end walls, partitions between sets of rotor and stator plates, rigidly connected to the side walls and bottom, spaced rods supporting the stator plates, each stator plate being supported by both rods, said rods being supported by the partitions and being rigidly connected to the end walls, and a shaft supporting the rotor plates and rotatably supported in the partitions and journaled in the end walls, for the purposes set forth.

2. In a condenser construction as set forth in claim 1, a cover made up of rigidly connected side and end walls and a top rigidly connected to said cover side and end walls, said side and end walls having bearings on the side and end walls, respectively, of the box, holding the box and cover walls in rigid relation to each other, and the partitions being rigidly secured to the cover as well as to the box bottom and walls, for the purposes set forth.

STUART J. THOMAS.